United States Patent
Hapsari et al.

(10) Patent No.: US 8,699,454 B2
(45) Date of Patent: Apr. 15, 2014

(54) MOBILE COMMUNICATION METHOD AND RADIO BASE STATION

(75) Inventors: Wuri Andarmawanti Hapsari, Yokosuka (JP); Masayuki Motegi, Yokohama (JP); Tadashi Uchiyama, Miura (JP)

(73) Assignee: NTT DoCoMo, Inc., Tokyo (JP)

( * ) Notice: Subject to any disclaimer, the term of this patent is extended or adjusted under 35 U.S.C. 154(b) by 194 days.

(21) Appl. No.: 12/866,856

(22) PCT Filed: Feb. 6, 2009

(86) PCT No.: PCT/JP2009/052028
§ 371 (c)(1),
(2), (4) Date: Oct. 1, 2010

(87) PCT Pub. No.: WO2009/099170
PCT Pub. Date: Aug. 13, 2009

(65) Prior Publication Data
US 2011/0013593 A1    Jan. 20, 2011

(30) Foreign Application Priority Data
Feb. 8, 2008  (JP) ................ 2008-029770

(51) Int. Cl.
*H04W 4/00*    (2009.01)

(52) U.S. Cl.
USPC ............................ 370/331; 370/326; 370/329

(58) Field of Classification Search
None
See application file for complete search history.

(56) References Cited

U.S. PATENT DOCUMENTS

| | | | |
|---|---|---|---|
| 2008/0108354 A1* | 5/2008 | Nagata | 455/438 |
| 2009/0061876 A1* | 3/2009 | Ho et al. | 455/436 |

FOREIGN PATENT DOCUMENTS

| | | |
|---|---|---|
| JP | 2007-266790 A | 10/2007 |
| JP | 2008-187252 A | 8/2008 |
| JP | 2008-236269 A | 10/2008 |

OTHER PUBLICATIONS

Samsung; "Method to release resources at source ENB during handover"; 3GPP TSG-RAN WG3 #53 meeting; R3-061032; Tallinn, Estonia; Aug. 28-Sep. 1, 2006.*
International Search Report w/translation from PCT/JP2009/052028 dated Apr. 28, 2009 (4 pages).
Written Opinion from PCT/JP2009/052028 dated Apr. 28, 2009 (4 pages).

* cited by examiner

*Primary Examiner* — Faruk Hamza
*Assistant Examiner* — Diane Lo
(74) *Attorney, Agent, or Firm* — Osha Liang LLP

(57) ABSTRACT

A mobile communication method according to the present invention includes: the steps of: (A) transferring, from a first radio base station (S-eNB) to an upper level node (S-GW), consecutive uplink data received from a mobile station (UE) with their sequence numbers being consecutive, by use of a resource allocated by the upper level node (S-GW), when the first radio base station (S-eNB) determines that the mobile station (UE) is to perform a handover; (B) transmitting, from the first radio base station (S-eNB) to the upper level node (S-GW) transfer completion notification data after the transfer of the consecutive uplink data to the upper level node (S-GW) is completed; and (C) releasing, at the upper level node (S-GW), the resource when receiving the transfer completion notification data.

6 Claims, 6 Drawing Sheets

MOBILE COMMUNICATION METHOD AND RADIO BASE STATION

TECHNICAL FIELD

The present invention relates to a mobile communication method and a radio base station.

BACKGROUND ART

In a mobile communication system employing the LTE (Long Term Evolution) system, which is specified in the 3GPP, a handover source radio base station S-eNB is configured to perform the following operation, when determining that a mobile station UE is to perform a handover (X2 handover) from a cell controlled by the handover source radio base station S-eNB to a cell controlled by a handover destination radio base station T-eNB. Here, the handover source radio base station S-eNB transfers consecutive uplink data (accumulated in a receiving buffer) to a serving gateway apparatus S-GW, by using a U-plane resource (GTP (GPRS Tunneling Protocol)-U tunnel) allocated between the handover source radio base station S-eNB and the serving gateway apparatus S-GW, and also transfers non-consecutive uplink data (accumulated in the receiving buffer) to the handover destination radio base station T-eNB. The consecutive uplink data refers to uplink data that are received by the handover source radio base station S-eNB from the mobile station UE with their sequence numbers being consecutive (In-sequence). The non-consecutive uplink data refers to uplink data that are received by the handover source radio base station S-eNB from the mobile station UE with their sequence numbers being not consecutive (Out-sequence).

In addition, in the aforementioned mobile communication system, the handover source radio base station S-eNB is configured to notify, to the handover destination radio base station T-eNB, a transfer status of the non-consecutive uplink data to the handover destination radio base station T-eNB by using a C-plane resource (specifically, to transmit an "SN Status Transfer" message).

Meanwhile, in the aforementioned mobile communication system, the handover source radio base station S-eNB may be configured to perform the following operation, when determining that a mobile station UE is to perform a handover (S1 handover) from a cell controlled by the handover source radio base station S-eNB to a cell controlled by a handover destination radio base station T-eNB. Here, the handover source radio base station S-eNB uses "Indirect Forwarding" to transfer, to the serving gateway apparatus S-GW, consecutive uplink data (accumulated in the receiving buffer) received from the mobile station UE with their sequence numbers being consecutive (In-sequence), by using a U-plane resource (GTP-U tunnel) allocated between the handover source radio base station S-eNB and the serving gateway apparatus S-GW. Meanwhile, the handover source radio base station S-eNB discards non-consecutive uplink data (accumulated in the receiving buffer) received from the mobile station UE with their sequence numbers being not consecutive (Out-sequence).

Moreover, in the aforementioned mobile communication system, the handover source radio base station S-eNB may be configured to perform the following operation, when determining that a mobile station UE is to perform a handover (S1 handover) from a cell controlled by the handover source radio base station S-eNB to a cell controlled by the handover destination radio base station T-eNB. Here, the handover source radio base station S-eNB uses "Direct Forwarding" to transfer, to the handover destination radio base station T-eNB, consecutive uplink data (accumulated in the receiving buffer) received from the mobile station UE with their sequence numbers being consecutive (In-sequence), by using a U-plane resource (GTP-U tunnel) allocated between the handover source radio base station S-eNB and the handover destination radio base station T-eNB. Meanwhile, the handover source radio base station S-eNB discards non-consecutive uplink data (accumulated in the receiving buffer) received from the mobile station UE with their sequence numbers being not consecutive (Out-sequence).

Further, in the aforementioned mobile communication system, the handover source radio base station S-eNB is configured to perform the following operation, when determining that the mobile station UE is to perform a handover (S1 handover) from a cell controlled by the handover source radio base station S-eNB to a cell controlled by the handover destination radio base station T-eNB. Here, the handover source radio base station S-eNB transfers downlink data to the handover destination radio base station T-eNB, the downlink data being downlink data which are among the downlink data received from the serving gateway apparatus S-GW and whose transmission to the mobile station UE is not completed yet (downlink data for which ACK is not received).

However, in the conventional mobile communication system employing the LTE system, there is a problem that, when a mobile station UE performs an X2 handover and an S1 handover, the serving gateway apparatus S-GW cannot know how long the serving gateway apparatus S-GW needs to hold the U-plane resource (GTP-U tunnel), because the serving gateway apparatus S-GW (or handover destination radio base station T-eNB) cannot detect completion of the transfer of the consecutive uplink data to the serving gateway apparatus S-GW by the handover source radio base station S-eNB.

In addition, there is another problem in the conventional mobile communication system employing the LTE system. The problem is that, when a mobile station UE performs an S1 handover, the handover destination radio base station T-eNB cannot perform sequence control between the downlink data received from the serving gateway apparatus S-GW and the downlink data received from the handover source radio base station S-eNB, because the handover destination radio base station T-eNB cannot detect completion of the transfer of the downlink data to the handover destination radio base station T-eNB by the handover source radio base station S-eNB.

DISCLOSURE OF THE INVENTION

The present invention has been made in view of the aforementioned problems. An objective of the invention is thus to provide a mobile communication method and a radio base station which allow the serving gateway apparatus S-GW to detect completion of the transfer of the consecutive uplink data to the serving gateway apparatus S-GW (or handover destination radio base station T-eNB) by the handover source radio base station S-eNB, when a mobile station UE performs an X2 handover and an S1 handover.

In addition, the present invention has been made in view of the aforementioned problems. Another objective of the invention is thus to provide a mobile communication method and a radio base station which allows the handover destination radio base station T-eNB to detect completion of the transfer of the downlink data to the handover destination radio base station T-eNB by the handover source radio base station S-eNB, when a mobile station UE performs an S1 handover.

A first aspect of the present invention is summarized as a mobile communication method including: the steps of: (A)

transferring, from a first radio base station to an upper level node, consecutive uplink data received from a mobile station with their sequence numbers being consecutive, by use of a resource allocated by the upper level node, when the first radio base station determines that the mobile station is to perform a handover from a cell controlled by the first radio base station to a cell controlled by a second radio base station; (B) transmitting, from the first radio base station to the upper level node transfer completion notification data after the transfer of the consecutive uplink data to the upper level node is completed, the transfer completion notification data indicating the completion of the transfer of the consecutive uplink data; and (C) releasing, at the upper level node, the resource when receiving the transfer completion notification data.

In the first aspect of the present invention, in the step (A), the first radio base station can transfer, to the second radio base station, non-consecutive uplink data received from the mobile station with their sequence numbers being not consecutive; and in the step (B), the first radio base station can transmit the transfer completion notification data to the second radio base station, after the transfer of the non-consecutive uplink data to the second radio base station is completed.

A second aspect of the present invention is summarized as a mobile communication method including the steps of: (A) transferring, from a first radio base station to a second radio base station, consecutive uplink data received from a mobile station with their sequence numbers being consecutive, by use of a resource allocated by the second radio base station, when the first radio base station determines that the mobile station is to perform a handover from a cell controlled by the first radio base station to a cell controlled by the second radio base station; (B) transmit, from the first radio base station to the second radio base station, transfer completion notification data after the transfer of the consecutive uplink data to the second radio base station is completed, the transfer completion notification data notifying the second radio base station of the completion of the transfer of the consecutive uplink data; and (C) releasing, at the second radio base station, the resource, when receiving the transfer completion notification data.

In the second aspect of the present invention, in the step (A), the first radio base station can discard the non-consecutive uplink data received from the mobile station with their sequence numbers being not consecutive.

A third aspect of the present invention is summarized as a mobile communication method including the steps of: (A) transferring, from a first radio base station to a second radio base station, the downlink data which are among the downlink data received from an upper level node and whose transmission to a mobile station is not completed yet, when the first radio base station determines that the mobile station is to perform a handover from a cell controlled by the first radio base station to a cell controlled by the second radio base station; and (B) performing, at the second radio base station, sequence control between downlink data received from the upper level node and the downlink data received from the first radio base station by use of transfer completion notification data, when receiving the transfer completion notification data.

In the third aspect of the present invention, the mobile communication method can further include the step of: (C) transmitting, from the first radio base station to the second radio base station, the transfer completion notification data, after the transfer of the downlink data from the first radio base station to the second radio base station is completed, the transfer completion notification data indicating the completion of the transfer of the downlink data.

In the third aspect of the present invention, the mobile communication method can further include the step of: (D) transmitting, from the first radio base station to the second radio base station, transmit the transfer completion notification data received from the upper level node.

In the third aspect of the present invention, in the step (A), when receiving no downlink data from the upper level node for a predetermined period of time, the first radio base station can transmit the transfer completion notification data to the second radio base station.

In the third aspect of the present invention, in the step (A), when receiving a switch completion notice from the upper level node, the first radio base station can transmit the transfer completion notification data to the second radio base station, the switch completion notice notifying that transfer of downlink data to the second radio base station is started.

A fourth aspect of the present invention is summarized as a radio base station including: an uplink data transfer unit configured to transfer, to an upper level node, consecutive uplink data received from the mobile station with their sequence numbers being consecutive, by use of a resource allocated by the upper level node, when it is determined that a mobile station is to perform a handover from a cell controlled by the radio base station to a cell controlled by a different radio base station; and a transfer completion notification data transmitter unit configured to transmit transfer completion notification data to the upper level node after the transfer of the consecutive uplink data to the upper level node is completed, the transfer completion notification data notifying that the transfer of the consecutive uplink data is completed.

In the fourth aspect of the present invention, the uplink data transfer unit can be configured to transfer, to the different radio base station, non-consecutive uplink data received from the mobile station with their sequence numbers being not consecutive, when it is determined that the mobile station is to perform a handover from the cell controlled by the radio base station to the cell controlled by the different radio base station; and the transfer completion notification data transmitter unit can be configured to transmit transfer completion notification data to the different radio base station after the transfer of the non-consecutive uplink data to the different radio base station is completed, the transfer completion notification data notifying that the transfer of the non-consecutive uplink data is completed.

A fifth aspect of the present invention is summarized as a radio base station including: an uplink data transfer unit configured to transfer, to a different radio base station consecutive uplink data received from the mobile station with their sequence numbers being consecutive, by use of a resource allocated by the different radio base station, when it is determined that a mobile station is to perform a handover from a cell controlled by the radio base station to a cell controlled by the different radio base station; and a transfer completion notification data transmitter unit configured to transmit transfer completion notification data to the different radio base station, after the transfer of the consecutive uplink data to the different radio base station is completed, the transfer completion notification data notifying that the transfer of the consecutive uplink data to the different radio base station is completed.

In the fifth aspect of the present invention, the uplink data transfer unit can be configured to discard the non-consecutive uplink data received from the mobile station with their sequence numbers being not consecutive.

A sixth aspect of the present invention is summarized as a radio base station including: a downlink data transfer unit configured to transfer down link data to a different radio base station when it is determined that a mobile station is to perform a handover from a cell controlled by the radio base station to a cell controlled by the different ration base station, the downlink data being downlink data which are among the downlink data received from an upper level node and whose transmission to the mobile station is not completed yet; and a transfer completion notification data transmitter unit configured to transmit transfer completion notification data to the different radio base station after the transfer of the downlink data from the radio base station to the different radio base station is completed, the transfer completion notification data indicating the completion of the transfer of the downlink data.

In the sixth aspect of the present invention, the transfer completion notification data transmitter unit can be configured to transmit the transfer completion notification data to the different radio base station, when no downlink data is received from the upper level node for a predetermined period of time.

In the sixth aspect of the present invention, the transfer completion notification data transmitter unit can be configured to transmit the transfer completion notification data to the different radio base station, when a switch completion notice is received from the upper level node, the switch completion notice notifying that transfer of downlink data to the different radio base station is started.

BEST MODE FOR CARRYING OUT THE INVENTION (Mobile Communication System According To First Embodiment Of Present Invention)

A mobile communication system according to a first embodiment of the present invention will be described with reference to FIGS. 1 and 2.

In this embodiment, a mobile communication system employing the LTE (Long Term Evolution) system is used as an example to describe the embodiment. However, the present invention is applicable to a system other than the aforementioned mobile communication system.

Figure 1:
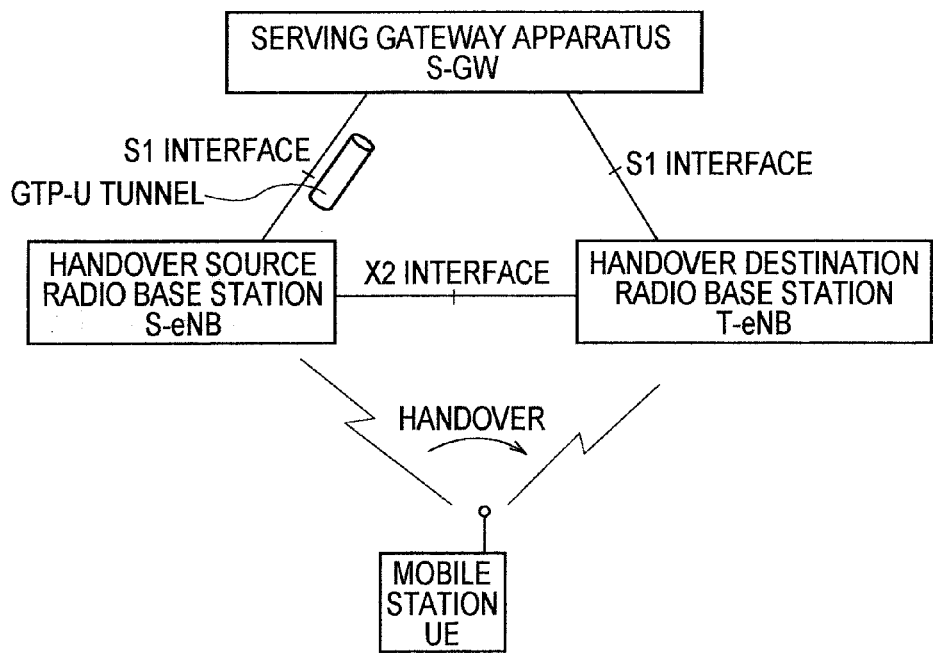
FIG. 1 is an overall configuration diagram of a mobile communication system according to a first embodiment of the present invention.

As shown in FIG. 1, in this embodiment, a description will be given of an example of a case where a mobile station UE performs a handover (X2 handover, Inter-eNB handover) from a cell (handover source cell) controlled by a handover source radio base station (first radio base station) S-eNB to a cell (handover destination cell) controlled by a handover destination radio base station (second radio base station) T-eNB.

Figure 2:
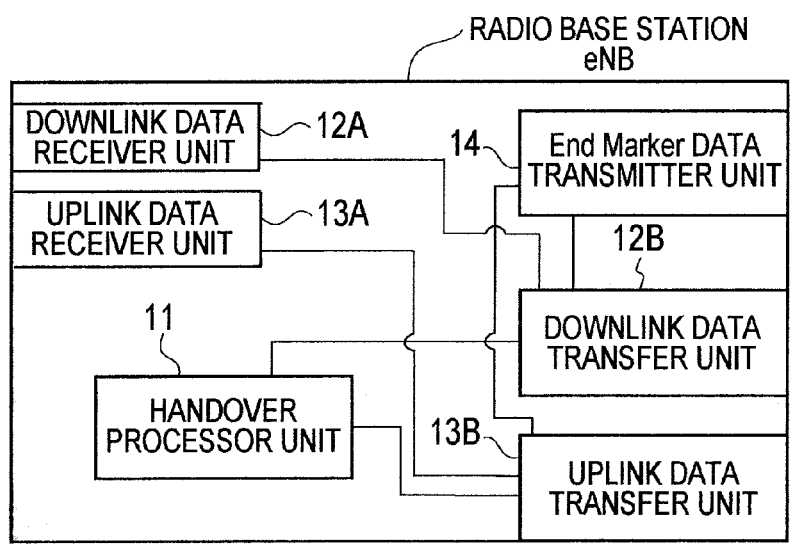
FIG. 2 is a functional block diagram of a radio base station according to the first embodiment of the present invention.

As shown in FIG. 2, a radio base station eNB according to the first embodiment includes a handover processor unit 11, a downlink data receiver unit 12A, a downlink data transfer unit 12B, an uplink data receiver unit 13A, an uplink data transfer unit 13B and an End Marker data transmitter unit 14.

The handover processor unit 11 is configured to perform processing relating to a handover (X2 handover or S1 handover, for example) of the mobile station UE.

Specifically, the handover processor unit 11 of the handover source radio base station S-eNB is configured to determine on the basis of a measurement report (Measurement Report message) received from a mobile station UE connected to the handover source radio base station S-eNB whether or not the mobile station UE is to perform a handover from a cell controlled by the handover source radio base station S-eNB to a cell controlled by the handover destination radio base station T-eNB.

The downlink data receiver unit 12A is configured to receive downlink data transmitted from a serving gateway apparatus S-GW (upper level node).

The downlink data transfer unit 12B of the handover source radio base station S-eNB is configured to transfer downlink data to the handover destination radio base station T-eNB, the downlink data being downlink data which are among the downlink data received from the serving gateway apparatus S-GW and whose transmission to the mobile station UE is not completed yet, i.e., the downlink data for which no positive delivery acknowledgment information (ACK) is received from the mobile station UE.

Here, the downlink data transfer unit 12B of the handover source radio base station S-eNB may be configured to transfer downlink data to the handover destination radio base station T-eNB, the downlink data including not only the downlink data for which no ACK is received, but also all of the downlink data transmitted after the first downlink data for which no ACK is received (including downlink data for which ACK is received) among the downlink data accumulated in a downlink data transmission buffer (including the downlink data received via an S1 interface after the start of the handover).

The uplink data receiver unit 13A is configured to receive uplink data transmitted from a mobile station UE.

The uplink data transfer unit 13B of the handover source radio base station S-eNB is configured to transfer consecutive uplink data to the serving gateway apparatus S-GW by using a U-plane resource (GTP-U tunnel), when the handover source radio base station S-eNB determines that a mobile station UE is to perform a handover from a cell controlled by the handover source radio base station S-eNB to a cell controlled by the handover destination radio base station T-eNB. Here, the U-plane resource is allocated by the serving gateway apparatus S-GW (upper level node), and the consecutive uplink data are uplink data which are received from the mobile station UE with their sequence numbers being consecutive (In-sequence) (consecutive uplink data being uplink data which are accumulated in the receiving buffer with their sequence numbers being consecutive (In-sequence)).

In addition, the uplink data transfer unit 13B of the handover source radio base station S-eNB is configured to transfer non-consecutive uplink data to the handover destination radio base station T-eNB, when the handover source radio base station S-eNB determines that a mobile station UE is to perform a handover from a cell controlled by the handover source radio base station S-eNB to a cell controlled by the handover destination radio base station T-eNB. Here, the non-consecutive uplink data are uplink data which are received from the mobile station UE with their sequence numbers being not consecutive (Out-sequence) (non-consecutive uplink data being uplink data which are accumulated in the receiving buffer with their sequence numbers being not consecutive (Out-sequence)).

The End Marker data transmitter unit 14 is configured to transmit End Marker data (transfer completion notification data) to the serving gateway apparatus S-GW, after the transfer of the aforementioned consecutive uplink data to the serving gateway apparatus S-GW is completed. Here, the End Marker data notifies, to the serving gateway apparatus S-GW, the completion of the transfer of the consecutive uplink data.

In addition, the End Marker data transmitter unit 14 may be configured to transmit End Marker data to the handover destination radio base station T-eNB, after the transfer of the aforementioned non-consecutive uplink data to the handover destination radio base station T-eNB is completed.

(Operation of Mobile Communication System According to First Embodiment of Present Invention)

A description will be given of an operation of the mobile communication system according to the first embodiment of the present invention with reference to FIGS. 3 to 4.

Figure 3:
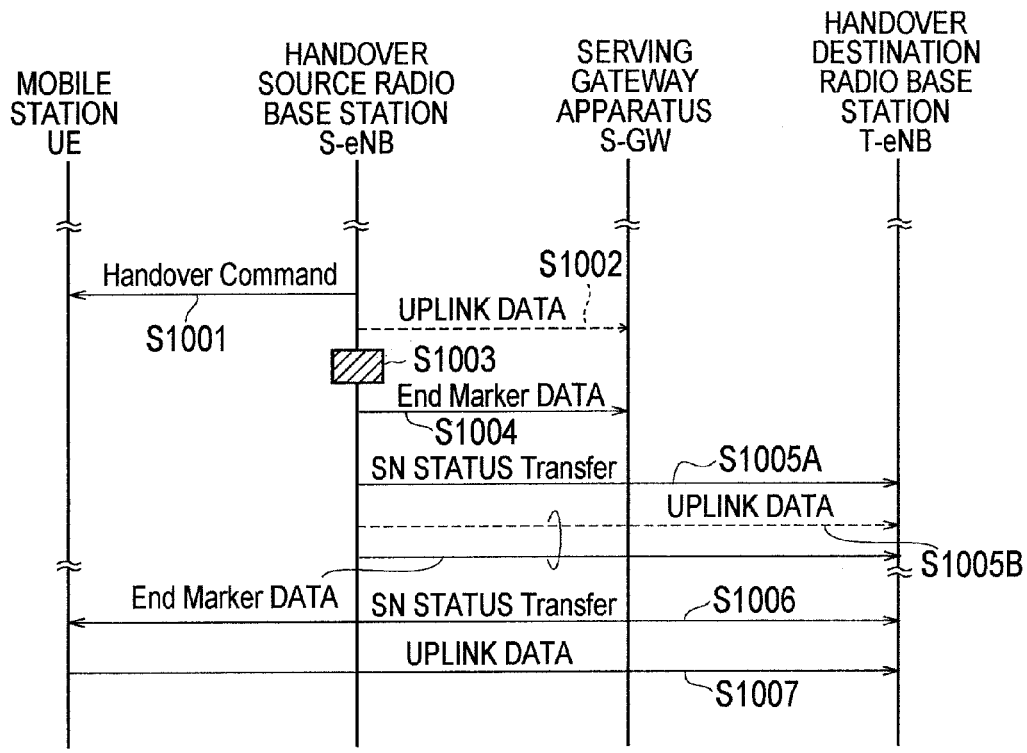
FIG. 3 is a sequence diagram showing an X2 handover procedure in the mobile communication system according to the first embodiment of the present invention.

As shown in FIG. 3, in step S1001, the handover source radio base station S-eNB determines on the basis of a measurement report ("Measurement Report" message) received from a mobile station UE connected to the handover source radio base station S-eNB whether the mobile station UE is to perform a handover (X2 handover) from a cell controlled by the handover source radio base station S-eNB to a cell controlled by the handover destination radio base station T-eNB, and then transmits a handover command ("Handover Command" message) to the mobile station UE, the command instructing the mobile station UE to perform the handover.

In step S1002, the handover source radio base station S-eNB transfers consecutive uplink data to the serving gateway apparatus S-GW (upper level node) by use of a U-plane resource (GTP-U tunnel) allocated by the serving gateway apparatus S-GW. Here, the consecutive data are the uplink data which are received from the mobile station UE with their sequence numbers being consecutive (In-sequence) (consecutive uplink data being uplink data which are accumulated in the receiving buffer with their sequence numbers being consecutive (In-sequence)).

In step S1003, the handover source radio base station S-eNB detects non-consecutive uplink data which are uplink data received from the mobile station UE with their sequence numbers being not consecutive (Out-sequence) (non-consecutive uplink data being a uplink data which are accumulated in the receiving buffer with their sequence numbers being not consecutive (Out-sequence)).

Figure 4A:
FIG. 4 is a diagram describing the X2 handover procedure in the mobile communication system according to the first embodiment of the present invention.

Here, as shown in FIG. 4(a), an assumption is made that the handover source radio base station S-eNB receives uplink data with sequence numbers "0" to "3", "5", "6" and "8" from the mobile station UE, and accumulates the uplink data in the receiving buffer.

In this case, the uplink data with the sequence numbers 0" to "3" are the consecutive uplink data which are uplink data received from the mobile station UE with their sequence numbers being consecutive (In-sequence) (consecutive uplink data being uplink data which are accumulated in the receiving buffer with their sequence numbers being consecutive (In-sequence)).

In addition, the uplink data with the sequence numbers "5", "6" and "8" are the non-consecutive uplink data which are uplink data received from the mobile station UE with their sequence numbers being not consecutive (Out-sequence) (non-consecutive uplink data being uplink data which are accumulated in the receiving buffer with their sequence numbers being not consecutive (Out-sequence)).

Note that, in the example shown in FIG. 4(a), the uplink data with the sequence numbers "5" and "6" are received in a consecutive manner in the radio base station S-eNB, but the uplink data are treated as non-consecutive uplink data, because the uplink data with the sequence number "4" of the handover source is not received.

In step S1004, the handover source radio base station S-eNB determines that the transfer of the aforementioned consecutive uplink data to the serving gateway apparatus S-GW is completed, and thus transmits End Marker data to the serving gateway apparatus S-GW. Here, the End Marker data notifies, to the serving gateway apparatus S-GW, the completion of the transfer of the consecutive uplink data.

In step S1005A, the handover source radio base station S-eNB notifies, to the handover destination radio base station T-eNB, a transfer status of the aforementioned non-consecutive uplink data to the handover destination radio base station T-eNB (specifically, transmits an "SN Status Transfer" message).

In the example shown in FIG. 4(a), the "SN Status Transfer" message) indicates that the uplink data with the sequence numbers "5", "6" and "8" are transferred to the handover destination radio base station T-eNB.

In step S1005B, the handover source radio base station S-eNB transfers the aforementioned non-consecutive uplink data to the handover destination radio base station T-eNB.

Here, when the transfer of the aforementioned non-consecutive uplink data to the handover destination radio base station T-eNB is completed, the handover source radio base station S-eNB transmits End Marker data to the handover destination radio base station T-eNB. Here, the End Marker data notifies, to the handover destination radio base station T-eNB, the completion of the transfer of the non-consecutive uplink data.

Here, step S1005B may be performed before step S1004 or S1005A.

In step S1006, the handover destination radio base station T-eNB notifies the mobile station UE of the aforementioned "SN Status Transfer" message.

In step S1007, the mobile station UE performs retransmission control of the uplink data in accordance with positive delivery acknowledgment information (ACK) received from the handover source radio base station S-eNB and the "SN Status Transfer" message notified by the handover destination radio base station T-eNB.

Figure 4B:
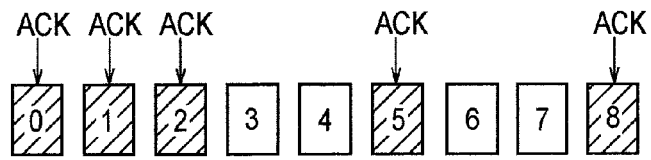
Figure 4C:
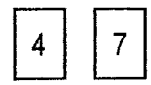

For example, as shown in FIG. 4(b), when receiving the delivery acknowledgment information (ACK) for the uplink data with the sequence numbers "0" to "2", "5" and "8", and then receiving the "SN Status Transfer" message indicating the transfer status of the uplink data shown in FIG. 4(a), the mobile station UE retransmits only the uplink data with the sequence numbers "4" and "7" as shown in FIG. 4(c).

(Effects and Advantages of Mobile Communication System According to First Embodiment of Present Invention)

With the mobile communication system according to the first embodiment of the present invention, when a mobile station UE performs an X2 handover, the serving gateway apparatus S-GW can detect completion of transfer of consecutive uplink data to the serving gateway apparatus S-GW by the handover source radio base station S-eNB by use of End Marker data.

(Mobile Communication System According to Second Embodiment of Present Invention)

A description will be given of a mobile communication system according to a second embodiment of the present invention with reference to FIGS. 5 through 7. In the following description of the mobile communication system according to the second embodiment, the mobile communication system will be described focusing on differences from the mobile communication system according to the first embodiment described above.

Figure 5:
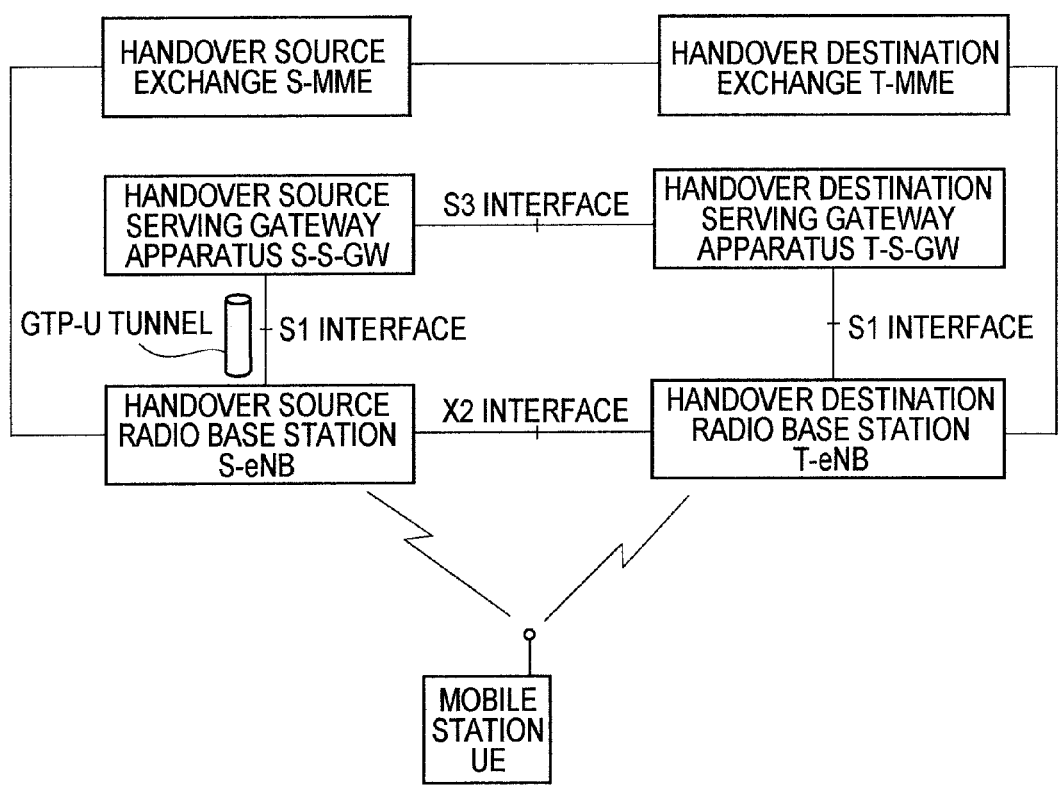
FIG. 5 is an overall configuration diagram of a mobile communication system according to a second embodiment of the present invention.

As shown in FIG. 5, in this embodiment, a description will be given of an example focusing on downlink data of a case where a mobile station UE performs a handover (S1 handover, Inter-eNB handover) from a cell (handover source cell) controlled by a handover source radio base station (first radio base station) S-eNB to a cell (handover destination cell) controlled by a handover destination radio base station (second radio base station) T-eNB.

In this embodiment, the End Marker data transmitter unit 14 of the handover source radio base station S-eNB is configured to perform the following operation, in a case where an "Indirect Forwarding" method is used. Here, the End Marker data transmitter unit 14 transmits End Marker data (transfer completion notification data) to a handover source serving gateway apparatus S-S-GW, after transfer of downlink data from the handover source radio base station S-eNB to the handover destination radio base station T-eNB through the handover source serving gateway apparatus S-S-GW and a handover destination serving gateway apparatus T-S-GW is completed. Here, the End Marker data indicates the completion of the transfer of the downlink data.

In addition, the End Marker data transmitter unit 14 of the handover source radio base station S-eNB is configured to perform the following operation, in a case where a "Direct Forwarding" method is used. Here, the End Marker data transmitter unit 14 transmits End Marker data (transfer completion notification data) to the handover destination radio base station T-eNB, after transfer of downlink data to the handover destination radio base station T-eNB not through the handover source serving gateway apparatus S-S-GW and the handover destination serving gateway apparatus T-S-GW is completed by the handover source radio base station S-eNB. Here, the End Marker data indicates the completion of the transfer of the downlink data.

Specifically, the End Marker data transmitter unit 14 of the handover source radio base station S-eNB may be configured to transmit End Marker data to the handover destination radio base station T-eNB or the handover source serving gateway apparatus S-S-GW, when no downlink data is received from the handover source serving gateway apparatus S-S-GW for a predetermined period of time.

In addition, the End Marker data transmitter unit 14 of the handover source radio base station S-eNB may be configured to transmit End Marker data to the handover destination radio base station T-eNB or the handover source serving gateway apparatus S-S-GW, when a switch completion notice (a "Release Resource" message in the S1 handover procedure) is received from a handover source exchange S-MME (upper level node). Here, the switch completion notice notifies that transfer of downlink data to the handover destination radio base station T-eNB is started.

In addition, when End Marker data is received from the handover source serving gateway apparatus S-S-GW (upper level node), the End Marker data transmitter unit 14 of the handover source radio base station S-eNB may be configured to transmit the received End Marker data to the handover destination radio base station T-eNB or the handover source serving gateway apparatus S-S-GW.

For example, when performing "Path Switch" from the handover source radio base station S-eNB to the handover destination radio base station T-eNB, the handover source serving gateway apparatus S-S-GW (upper level node) may be configured to transmit the above End Marker data to the handover source radio base station S-eNB.

Note that, the functions of the handover source serving gateway apparatus S-S-GW may be implemented in the handover source radio base station S-eNB, and also, the functions of the handover destination serving gateway apparatus T-S-GW may be implemented in the handover destination radio base station T-eNB.

Next, a description will be given of an operation of the mobile communication system according to the second embodiment of the present invention with reference to FIG. 6.

Figure 6:
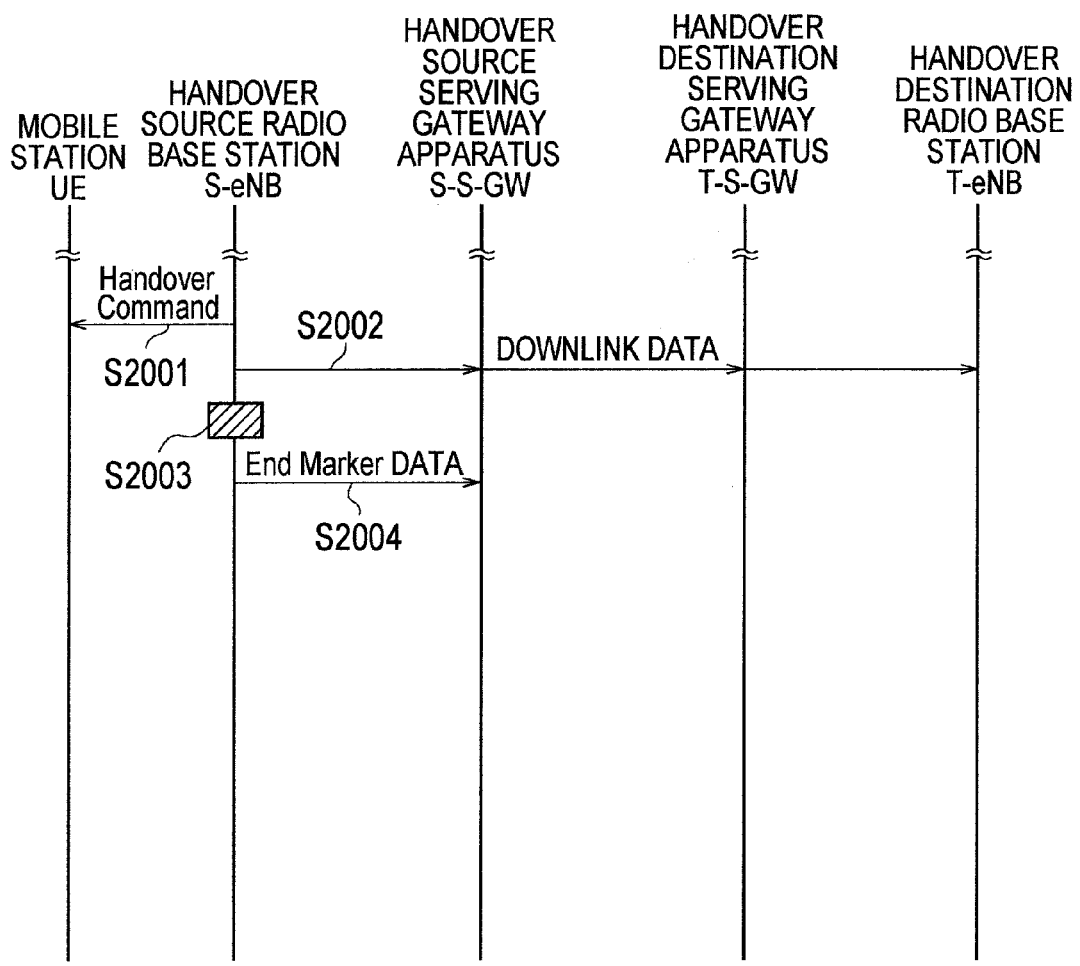
FIG. 6 is a sequence diagram showing an S1 handover procedure in the mobile communication system according to the second embodiment of the present invention.

As shown in FIG. 6, in step S2001, the handover source radio base station S-eNB determines on the basis of a measurement report ("Measurement Report" message) received from a mobile station UE connected to the handover source radio base station S-eNB whether the mobile station UE is to perform a handover over (S1 handover) from a cell controlled by the handover source radio base station S-eNB to a cell controlled the handover destination radio base station T-eNB. Then, the handover source radio base station S-eNB transmits a handover command ("Handover Command" message) to the mobile station UE, the command instructing the mobile station UE to perform the handover.

In step S2002, the handover source radio base station S-eNB transmits downlink data to the handover destination radio base station T-eNB, the downlink data being downlink data which are among the downlink data received from the handover source serving gateway apparatus S-S-GW and whose transmission to the mobile station UE is not completed yet, specifically, all of the downlink data transmitted after the first downlink data for which no positive delivery acknowledgment information (ACK) is received from the mobile station UE.

Here, in a case where the "Direct Forwarding" method is used, the handover source radio base station S-eNB transfers the aforementioned downlink data to the handover destination radio base station T-eNB not through the handover source serving gateway apparatus S-S-GW and the handover destination serving gateway apparatus T-S-GW. In a case where the "Indirect Forwarding" method is used, the handover source radio base station S-eNB transfers the aforementioned downlink data to the handover destination radio base station T-eNB through the handover source serving gateway apparatus S-S-GW and the handover destination serving gateway apparatus T-S-GW.

Figure 7:
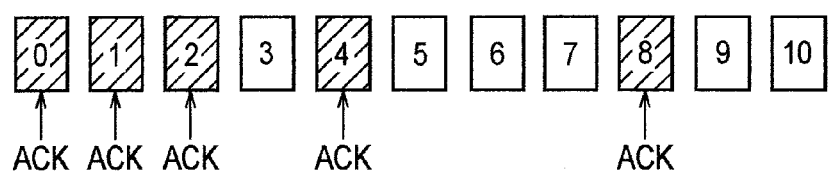
FIG. 7 is a diagram showing the S1 handover procedure in the mobile communication system according to the second embodiment of the present invention.

In the example shown in FIG. 7, since the handover source radio base station S-eNB has not received positive delivery acknowledgment information (ACK) for the downlink data with the sequence number "3", the handover source radio base station S-eNB transfers all of the downlink data with the sequence numbers "3" to "10" to the handover destination radio base station T-eNB.

In step S2003, the handover source radio base station S-eNB detects that the transfer of the downlink data from the handover source radio base station S-eNB to the handover destination radio base station T-eNB is completed. Then, the handover source radio base station S-eNB transmits End Marker data to the handover destination radio base station T-eNB in step S2004.

When receiving the End Marker data, the handover destination radio base station T-eNB performs sequence control between the downlink data received from the upper level node and the downlink data received from the first radio base station by use of the End Marker data.

Here, the End Marker data may be one that is transmitted by the handover source serving gateway apparatus S-S-GW.

With the mobile communication system according to the second embodiment of the present invention, when the mobile station UE performs an S1 handover, the handover destination radio base station T-eNB can detect completion of transfer of downlink data to the handover destination radio base station T-eNB by the handover source radio base station S-eNB by use of End Marker data. In addition, the handover source serving gateway apparatus S-S-GW can detect completion of transfer of downlink data from the handover source radio base station S-eNB to the handover source serving gateway apparatus S-S-GW by End Marker data.

Mobile Communication System According to Third Embodiment of Present Invention)

A description will be given of a mobile communication system according to a third embodiment of the present invention with reference to FIGS. 5, 8 and 9. In the following description of the mobile communication system according to the third embodiment, the mobile communication system will be described focusing on differences from the mobile communication system according to the first embodiment described above.

As shown in FIG. 5, in this embodiment, a description will be given of an example focusing on uplink data in a case where a mobile station UE performs a handover (S1 handover, Inter-eNB handover) from a cell (handover source cell) controlled by a handover source radio base station (first radio base station) S-eNB to a cell (handover destination cell) controlled by a handover destination radio base station (second radio base station) T-eNB.

In this embodiment, the uplink data transfer unit 13B of the handover source radio base station S-eNB is configured to discard uplink data received from a mobile station UE whose sequence numbers are not consecutive (uplink data accumulated in the receiving buffer whose sequence numbers are not consecutive).

Here, a description will be given of an operation of the mobile communication system according to the third embodiment of the present invention with reference to FIGS. 8 and 9.

Figure 8:
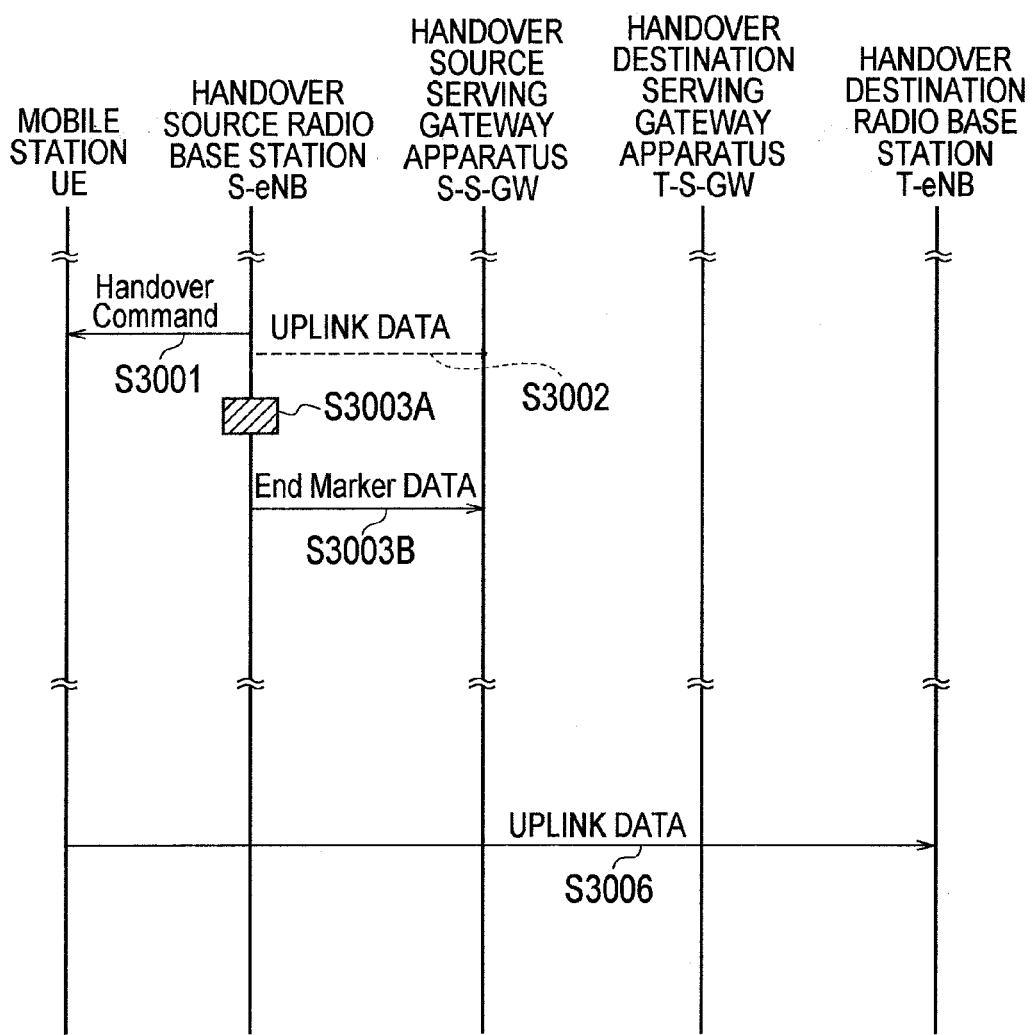
FIG. 8 is a sequence diagram showing an S1 handover procedure in a mobile communication system according to a third embodiment of the present invention.

As shown in FIG. 8, in step S3001, the handover source radio base station S-eNB determines on the basis of a measurement report ("Measurement Report" message) received from a mobile station UE connected to the handover source radio base station S-eNB whether the mobile station UE is to perform a handover (S1 handover) from a cell controlled by the handover source radio base station S-eNB to a cell controlled by the handover destination radio base station T-eNB. Then, the handover source radio base station S-eNB transmits a handover command ("Handover Command" message) to the mobile station UE, the command instructing the mobile station UE to perform the handover.

In step S3002, the handover source radio base station S-eNB transfers consecutive uplink data to the serving gateway apparatus S-GW (upper level node) by use of a U-plane resource (GTP-U tunnel) allocated by the serving gateway apparatus S-GW. Here, the consecutive uplink data are uplink data received from the mobile station UE with their sequence numbers being consecutive (In-sequence) (consecutive uplink data being uplink data which are accumulated in the receiving buffer with their sequence number being consecutive (In-sequence)).

In step S3003A, the handover source radio base station S-eNB discards non-consecutive uplink data without transferring the non-consecutive uplink data to the handover destination radio base station T-eNB. Here, the non-consecutive uplink data are uplink data which are received from the mobile station UE with their sequence numbers being not consecutive (Out-sequence) (non-consecutive uplink data being uplink data which are accumulated in the receiving buffer with their sequence numbers being not consecutive (Out-sequence)).

Figure 9A:
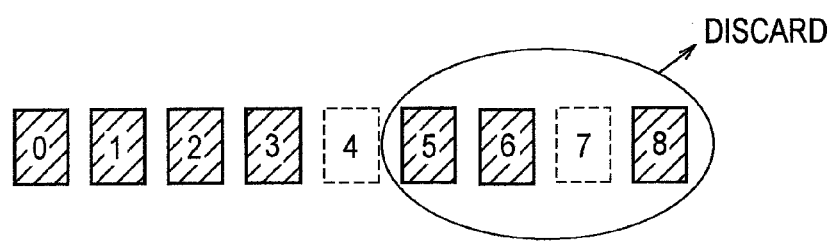
FIG. 9 is a diagram describing the S1 handover procedure in the mobile communication system according to the third embodiment of the present invention.

Here, as shown in FIG. 9(a), suppose that the handover source radio base station S-eNB receives the uplink data with the sequence numbers "0" to "3", "5", "6" and "8" from the mobile station UE, and accumulates the uplink data in the receiving buffer. In this case, the handover source radio base station S-eNB discards the uplink data with the sequence numbers "5", "6" and "8", which are non-consecutive uplink data.

In step S3003B, the handover source radio base station S-eNB determines that the transfer of the aforementioned consecutive uplink data to the serving gateway apparatus S-GW is completed, and then transmits End Marker data to the handover source_serving gateway apparatus S-S-GW. Here, the End Marker notifies, to the handover source_serving gateway apparatus S-S-GW, the completion of the transfer of the consecutive uplink data.

Here, the handover source radio base station S-eNB does not transmit the aforementioned "SN Status Transfer" message to the handover destination radio base station T-eNB.

Accordingly, the handover destination radio base station T-eNB does not notify the mobile station UE of the aforementioned "SN Status Transfer" message either.

For this reason, in step S3006, the mobile station UE performs retransmission control of the uplink data in accordance with only positive delivery acknowledgment information (ACK) received from the handover source radio base station S-eNB.

Figure 9B:
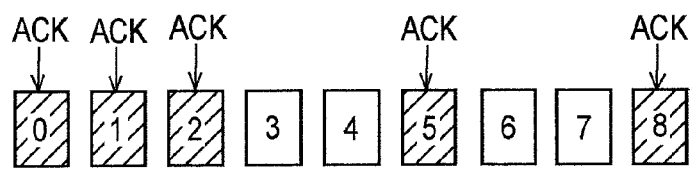
Figure 9C:
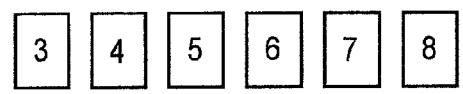

For example, as shown in FIG. 9(b), when the mobile station UE receives delivery acknowledgment information (ACK) for the uplink data with the sequence numbers "0" to "2", "5" and "8", the mobile station UE retransmits only the uplink data with the sequence numbers "3" to "8" as shown in FIG. 9(c).

With the mobile communication system according to the third embodiment of the present invention, when a mobile station UE performs an S1 handover, the serving gateway apparatus S-GW can detect completion of transfer of consecutive uplink data to the serving gateway apparatus S-GW by the handover source radio base station S-eNB by use of End Marker data.

Note that operation of the above described mobile station UE, the radio base station eNB, the exchange MME and the serving gateway apparatus S-GW may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB, the exchange MME and the serving gateway apparatus S-GW. Also, the storage medium and the processor may be provided in the mobile station UE, the radio base station eNB, the exchange MME and the serving gateway apparatus S-GW as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

Industrial Applicability

As described above, according to the present invention, it is possible to provide a mobile communication method and a radio base station which allow the serving gateway apparatus S-GW to detect completion of transfer of consecutive uplink data to the serving gateway apparatus S-GW (or handover destination radio base station T-eNB) by the handover source radio base station S-eNB when a mobile station UE performs an X2 handover and an S1 handover.

In addition, according to the present invention, it is possible to provide a mobile communication method and a radio base station which allow the handover destination radio base station T-eNB to detect completion of transfer of downlink data to the handover destination radio base station T-eNB by the handover source radio base station S-eNB when a mobile station UE performs an S1 handover.

The invention claimed is:

1. A mobile communication method comprising the steps of:
   (A) transferring, from a first radio base station to a second radio base station, the downlink data which are among the downlink data received from an upper level node and whose transmission to a mobile station is not completed yet, when the first radio base station determines that the mobile station is to perform a handover from a cell controlled by the first radio base station to a cell controlled by the second radio base station; and
   (B) performing, at the second radio base station, sequence control between downlink data received from the upper level node and the downlink data received from the first radio base station by use of transfer completion notification data, when receiving the transfer completion notification data,
   wherein in the step (A), when a receiving intermediate storage at the first radio base station has become empty and when receiving no downlink data from the upper level node for a predetermined period of time, the first radio base station transmits the transfer completion notification data to the second radio base station, and
   wherein the transfer completion notification data contains no downlink data.

2. The mobile communication method according to claim 1, further comprising the step of:
   (C) transmitting, from the first radio base station to the second radio base station, the transfer completion notification data, after the transfer of the downlink data from the first radio base station to the second radio base station is completed, the transfer completion notification data indicating the completion of the transfer of the downlink data.

3. The mobile communication method according to claim 2, wherein
   in the step (A), when receiving a switch completion notice from the upper level node, the first radio base station transmits the transfer completion notification data to the second radio base station, the switch completion notice notifying that transfer of downlink data to the second radio base station is started.

4. The mobile communication method according to claim 1, further comprising a step of:
   (D) transmitting, from the first radio base station to the second radio base station, the transfer completion notification data received from the upper level node.

5. A radio base station comprising:
   a downlink data transfer unit configured to transfer downlink data to a different radio base station when it is determined that a mobile station is to perform a handover from a cell controlled by the radio base station to a cell controlled by the different radio base station, the downlink data being downlink data which are among the downlink data received from an upper level node and whose transmission to the mobile station is not completed yet; and
   a transfer completion notification data transmitter unit configured to transmit transfer completion notification data to the different radio base station after the transfer of the downlink data from the radio base station to the different radio base station is completed, the transfer completion notification data indicating the completion of the transfer of the downlink data,
   wherein the different radio base station is configured to perform sequence control between downlink data received from the upper level node and the downlink data received from the radio base station by use of transfer completion notification data, when the transfer completion notification data is received, and
   wherein the transfer completion notification data transmitter unit is configured to transmit the transfer completion notification data to the different radio base station, when a receiving intermediate storage at the radio base station has become empty and when no downlink data is received from the upper level node for a predetermined period of time, and
   wherein the transfer completion notification data contains no downlink data.

6. The radio base station according to claim 5, wherein the transfer completion notification data transmitter unit is configured to transmit the transfer completion notification data to the different radio base station, when a switch completion notice is received from the upper level node, the switch completion notice notifying that transfer of downlink data to the different radio base station is started.

* * * * *